(12) United States Patent
Garland et al.

(10) Patent No.: US 10,104,876 B2
(45) Date of Patent: Oct. 23, 2018

(54) EMERSED SHELLFISH STORAGE

(71) Applicant: Clearwater Seafoods Limited Partnership, Nova Scotia (CA)

(72) Inventors: John J. Garland, Halifax (CA); Roger F. Uglow, Cottingham (GB)

(73) Assignee: Clearwater Seafoods Limited Partnership, Bedford, Nova Scotia (CA)

( * ) Notice: Subject to any disclaimer, the term of this patent is extended or adjusted under 35 U.S.C. 154(b) by 310 days.

(21) Appl. No.: 14/648,887

(22) PCT Filed: Dec. 17, 2013

(86) PCT No.: PCT/CA2013/050980
§ 371 (c)(1),
(2) Date: Jun. 1, 2015

(87) PCT Pub. No.: WO2014/094159
PCT Pub. Date: Jun. 26, 2014

(65) Prior Publication Data
US 2015/0366172 A1    Dec. 24, 2015

Related U.S. Application Data

(60) Provisional application No. 61/738,669, filed on Dec. 18, 2012.

(51) Int. Cl.
*A01K 63/00* (2017.01)
*A01K 63/02* (2006.01)
*A01K 63/04* (2006.01)

(52) U.S. Cl.
CPC ............ *A01K 63/02* (2013.01); *A01K 63/045* (2013.01); *A01K 63/047* (2013.01)

(58) Field of Classification Search
CPC .... A01K 63/02; A01K 63/045; A01K 63/047; A01K 63/04; A01K 63/00; B65D 85/50; B65D 81/22
(Continued)

(56) References Cited

U.S. PATENT DOCUMENTS 2,302,336 A * 11/1942 MacDonald ........... A01K 63/02
119/214
2,981,228 A * 4/1961 Brandano ............ A01K 63/003
119/214
(Continued)

FOREIGN PATENT DOCUMENTS

CA            1047333        1/1979
CA            2010834        6/1991
(Continued)

OTHER PUBLICATIONS

International PCT Search Report and Written Opinion dated Feb. 21, 2014 in respect of International PCT Application No. PCT/CA2013/050980 (9 pages).
(Continued)

*Primary Examiner* — Trinh T Nguyen
(74) *Attorney, Agent, or Firm* — McDonnell Boehnen Hulbert & Berghoff LLP

(57) ABSTRACT

The present disclosure relates to emersed shellfish storage. A container support has a surface to support containers. Each container has respective cells to accommodate live shellfish, such as lobster, in a vertical orientation substantially perpendicular to the surface. Water from a reservoir is pumped, intermittently in some embodiments, to one or more of the containers above the shellfish, and a collector collects and provides to the reservoir the water that is pumped by the pump system and flows over the shellfish. In an embodiment, the cells are provided by a divider that divides an interior space of each container, and the divider carries a
(Continued)

perforated top insert at or below a top edge of each container, to distribute fluids to the cells.

27 Claims, 2 Drawing Sheets

(58) Field of Classification Search
USPC .................................................. 119/201, 214
See application file for complete search history.

(56) References Cited

U.S. PATENT DOCUMENTS

| | | | | |
|---|---|---|---|---|
| 3,192,899 | A * | 7/1965 | Lucey | A01K 61/59 119/214 |
| 3,687,111 | A * | 8/1972 | Epper | A01K 63/02 119/201 |
| 3,727,579 | A | 4/1973 | Lee | |
| 4,089,298 | A * | 5/1978 | Wilson | A01K 63/02 119/201 |
| 4,240,376 | A * | 12/1980 | Kominami | A01K 63/00 119/214 |
| 4,427,548 | A * | 1/1984 | Quick, Jr. | A01K 63/04 119/227 |
| 4,455,966 | A * | 6/1984 | Knowles | A01K 63/02 119/203 |
| 5,042,260 | A * | 8/1991 | George, Sr. | A01K 63/02 229/120.36 |
| 5,156,111 | A * | 10/1992 | Heggelund | A01K 61/17 119/218 |
| 5,237,959 | A * | 8/1993 | Bergeron | A01K 63/02 119/201 |
| 5,309,868 | A * | 5/1994 | Tomiyama | A01K 63/02 119/203 |
| 5,310,427 | A * | 5/1994 | Manome | A01K 63/02 119/201 |
| 5,377,622 | A | 1/1995 | Lauttenbach et al. | |
| 5,555,845 | A | 9/1996 | Flynn | |
| 6,237,535 | B1 | 5/2001 | LaRosa | |
| 2007/0022966 | A1 * | 2/2007 | Torring | A01K 63/02 119/201 |
| 2009/0255479 | A1 | 10/2009 | Boudreau | |
| 2011/0061599 | A1 | 3/2011 | Boudreau | |

FOREIGN PATENT DOCUMENTS

| | | |
|---|---|---|
| CA | 2099523 | 1/1994 |
| CA | 2171989 A1 | 9/1997 |
| CA | 2339827 A1 | 2/2000 |
| CN | 2162086 Y | 4/1994 |
| CN | 201414345 Y | 3/2010 |
| CN | 102257982 A | 11/2011 |
| CN | 102550473 A | 7/2012 |
| CN | 102657134 A | 9/2012 |
| FR | 2572252 A1 | 5/1986 |
| FR | 2801472 A1 | 6/2001 |
| GB | 2292936 A | 3/1996 |
| JP | 2004-173584 A | 6/2004 |
| KR | 2009-0026869 A | 3/2009 |
| WO | 2006/099870 A1 | 9/2006 |

OTHER PUBLICATIONS

Rose Seafood Industries, Inc. IPL StakNest(TM) Containers Play Pivotal Role in Keeping Lobsters Alive Longer in the Revolutionary Habitat System (2 pages).

Chinese Office Action CN2013800659563 dated May 16, 2016, 14 pages.

Search Report for search dated Jul. 21, 2016 in Russian patent Application 2015129505, and English translation (3 pages).

Extended European Search Report dated Jul. 4, 2016 in European Patent Office Application 13 86 5544 (10 pages).

* cited by examiner

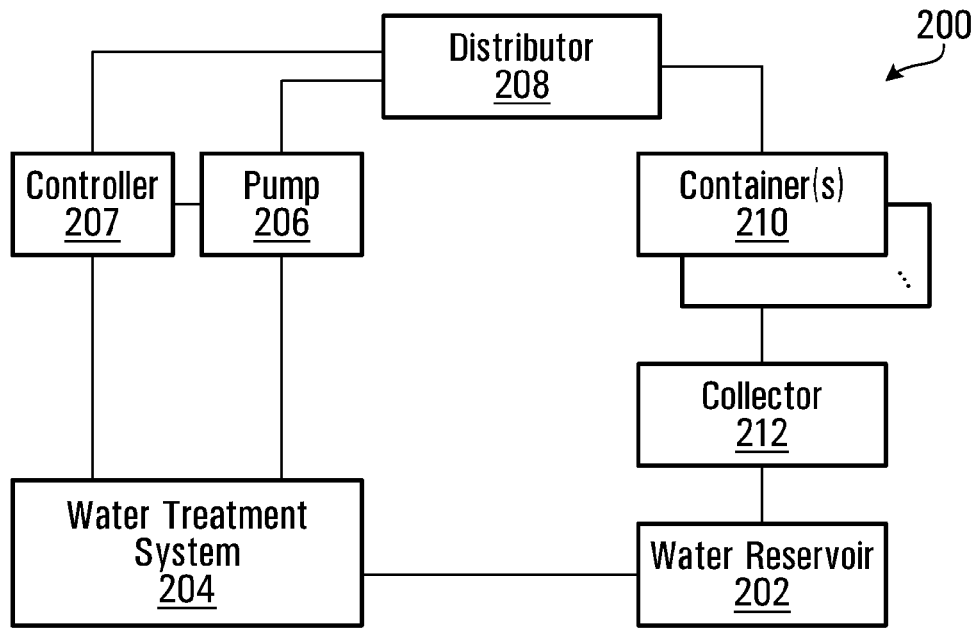
FIG. 2
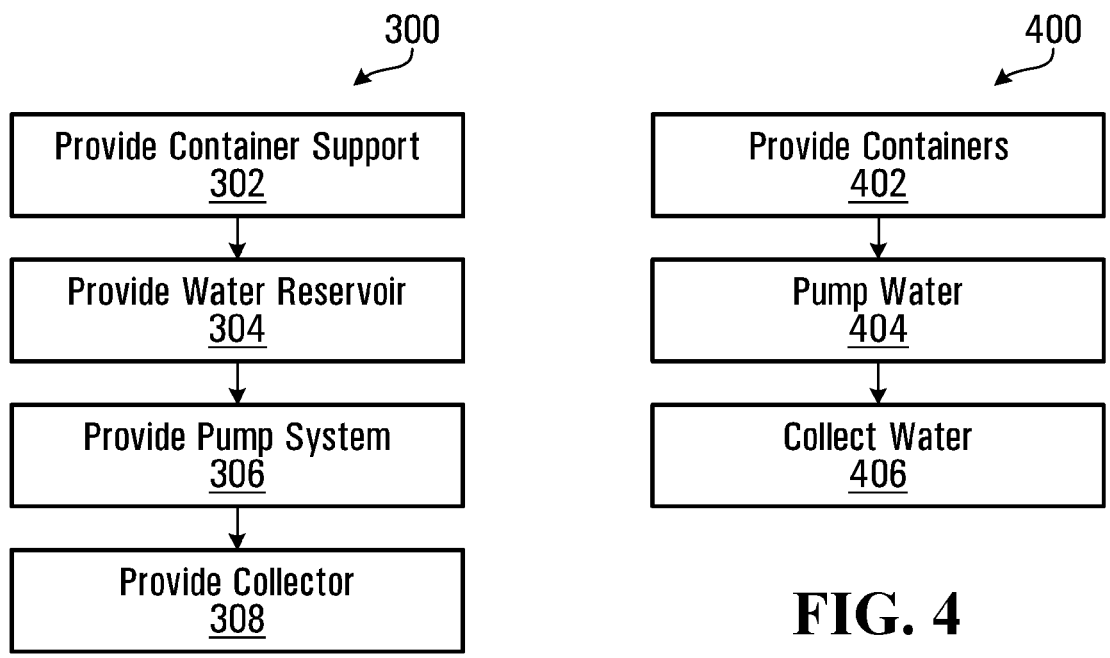
FIG. 3
FIG. 4

EMERSED SHELLFISH STORAGE

CROSS-REFERENCE TO RELATED APPLICATIONS

The present application is a National Phase application of, and claims the benefit of, International (PCT) Application Serial No. PCT/CA2013/050980, filed on Dec. 17, 2013, which claims priority to U.S. Provisional Patent Application No. 61/738,669, filed on Dec. 18, 2012, the entire contents of both which are incorporated herein by reference.

FIELD OF THE INVENTION

This invention relates generally to shellfish storage and, in particular, to emersed (out of water) storage of shellfish, such as lobsters, other crustaceans, and/or bivalves.

BACKGROUND

Live lobsters have the ability to live out of water for periods of time up to a practical maximum of approximately 48 to 60 hours. This allows for live lobsters to be successfully shipped to most markets around the world using airfreight. There has been a trend of reduced availability and options for airfreight in the last decade as airlines restructure to accommodate more passenger loads and introduce reduced airfreight capacity airplanes. This has led to logistics challenges for airfreighting live lobsters to certain destinations, for example.

SUMMARY

According to an aspect of the present disclosure, a system includes: a container support comprising a surface to support a plurality of containers, each container comprising respective cells to accommodate live shellfish in a vertical orientation substantially perpendicular to the surface; a water reservoir carried by the container support; a pump system coupled to the water reservoir and carried by the container support, to pump water from the reservoir to one or more of the containers above the shellfish; a collector coupled to the water reservoir and carried by the container support, to collect and provide to the reservoir water that is pumped by the pump system and flows over the shellfish.

In an embodiment, the water reservoir is integrated into the container support.

In an embodiment, the collector is integrated into the container support.

In an embodiment, the system also includes a power source coupled to the pump system and carried by the container support.

In an embodiment, the system also includes a water treatment system coupled to the water reservoir.

In an embodiment, the water treatment system includes one or more of: a filter; and an exchange mechanism to exchange water in the reservoir for fresh water.

In an embodiment, the system also includes containers stacked on the surface of the container support.

In an embodiment, the containers include multiple containers in a stack on the surface of the container support, the pump system pumps water from the reservoir to a top of a top container in the stack, and each container in the stack includes a drain through which water that flows over the shellfish in the container drains from the container.

In an embodiment, each container in the stack has a bottom insert that directs the water that flows over the shellfish to the drain.

In an embodiment, each container in the stack has a divider that provides the cells in the container.

In an embodiment, each container in the stack has a perforated top insert carried at or below a top edge of the container by the divider.

In an embodiment, each container in the stack has a plurality of top flaps, the containers in the stack below the top container in the stack are stacked with the top flaps open, and an open top flap of each of the containers below the top container in the stack is adjacent the drain of an upper container in the stack to direct water from the drain of the upper container in the stack onto the top insert.

Another aspect of the present disclosure provides a method that includes: providing a container support comprising a surface to support a plurality of containers, each container comprising respective cells to accommodate live shellfish in a vertical orientation substantially perpendicular to the surface; providing a water reservoir carried by the container support; providing a pump system coupled to the water reservoir and carried by the container support, to pump water from the reservoir to one or more of the containers above the shellfish; providing a collector coupled to the water reservoir and carried by the container support, to collect and provide to the reservoir water that is pumped by the pump system and flows over the shellfish.

In an embodiment, the water reservoir is provided as an integrated water reservoir integrated into the container support.

In an embodiment, the collector is provided as an integrated collector integrated into the container support.

In an embodiment, the method also involves providing a power source coupled to the pump system and carried by the container support.

In an embodiment, the method also involves providing a water treatment system coupled to the water reservoir.

In an embodiment, the water treatment system is provided as one or more of: a filter; and an exchange mechanism to exchange water in the reservoir for fresh water.

In an embodiment, the method also involves providing the plurality of containers.

According to a further aspect, a method includes: providing a plurality of containers on a container support, the container support comprising a surface to support the plurality of containers, a water reservoir, and a pump system, and each container comprising respective cells to accommodate live shellfish in a vertical orientation substantially perpendicular to the surface; pumping water from the reservoir to one or more of the containers above the shellfish using the pump system; collecting and providing to the reservoir water that is pumped by the pump system and flows over the shellfish.

In an embodiment, the plurality of containers comprise multiple containers in a stack on the surface of the container support, the pumping comprising pumping water from the reservoir to a top of a top container in the stack, and each container in the stack comprises a drain through which water that flows over the shellfish in the container drains to a lower container in the stack or from the container.

In an embodiment, each container in the stack comprises a bottom insert that directs the water that flows over the shellfish to the drain, each container in the stack comprises a perforated top insert carried at or below a top edge of the container by the divider, to distribute water to the cells in the container, each container in the stack comprises a plurality of top flaps, and the providing comprises providing the plurality of containers below the top container in the stack stacked with the top flaps open, and with an open top flap of each of the containers below the top container in the stack being adjacent the drain of an upper container in the stack to direct water from the drain of the upper container in the stack onto the top insert.

There is also provided a container comprising: a divider that divides an interior space of the container into respective cells to accommodate live shellfish in a vertical orientation substantially perpendicular to a bottom of the container; a perforated top insert, carried at or below a top edge of the container by the divider, that distributes fluids to the cells.

In an embodiment, the fluids comprise one or more of: water and air.

In an embodiment, the divider has fluid communication channels formed therein to enable fluid communication between adjacent cells of the plurality of cells.

A container support according to yet another aspect includes: a surface to support one or more containers that accommodate live shellfish; a water reservoir; a collector coupled to the water reservoir and carried by the container support, to collect and provide to the reservoir water that is pumped from the water reservoir and flows over the shellfish.

In an embodiment, the water reservoir is integrated into the container support.

In an embodiment, the container support also includes a water treatment system coupled to the water reservoir.

In an embodiment, the water treatment system comprises one or more of: a filter; and an exchange mechanism to exchange water in the reservoir for fresh water.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 2 is a block diagram illustrating another example emersed shellfish storage system.

FIGS. 3 and 4 are flow diagrams illustrating example methods.

DETAILED DESCRIPTION

Figure 1:
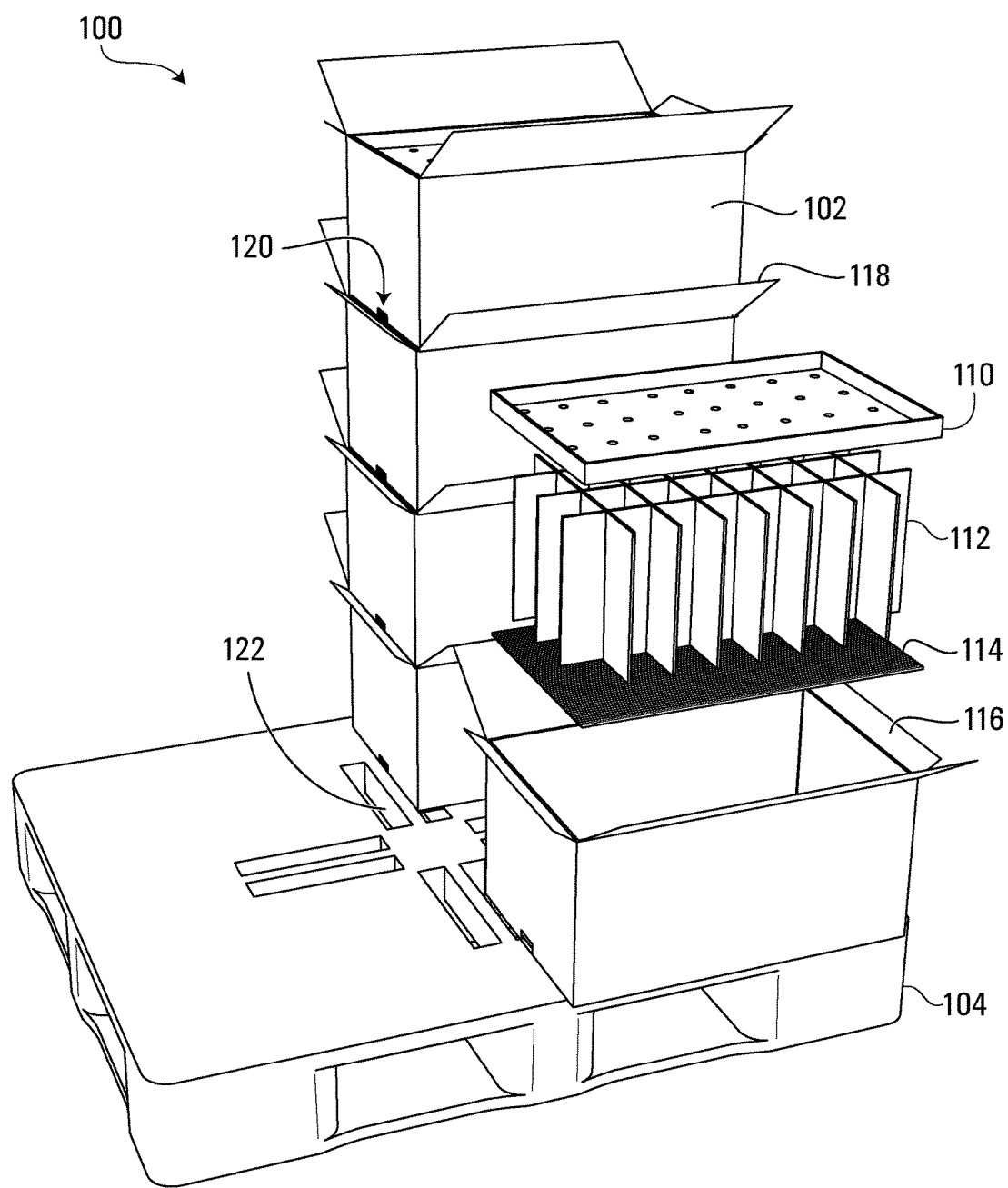
FIG. 1 is a diagram illustrating an example emersed shellfish storage system.

Embodiments of the present disclosure are described herein primarily in the context of lobsters. It should be appreciated that these are example embodiments only, and that the present disclosure could be applied more generally to shellfish, such as other crustaceans and/or bivalves, for instance.

One type of airfreight shipping box is designed to keep lobsters cool and humid during consignment. Lobsters are poikilotherms (cold blooded) and their metabolic rate is directly related to their body temperature. To keep their metabolism low during air shipment to customers, gel ice packs are used in the shipping boxes and these generally maintain lobsters just above freezing and below 5° C.

In natural, immersed conditions a lobster removes metabolic waste such as ammonia from its blood via the gills. The gills also exchange carbon dioxide with oxygen from the water. While out of water (emersed), this method of ammonia and carbon dioxide removal and oxygen uptake is diminished, and therefore ammonia and carbon dioxide accumulate in the blood and oxygen is depleted. This accumulation effect can be measured by analyzing blood samples. Warmer, more metabolically active lobsters will accumulate ammonia and carbon dioxide faster than cooler lobsters; hence the use of ice packs can keep their metabolic rates low to reduce the rate of build up of metabolic waste in their blood. At reduced temperatures in a shipping box, a lobster is able to withstand being out of water for 48 to 60 hours, which encompasses typical journey lengths for airfreight from North America to Asian and European seafood markets, for example. This time limit is partly based on ammonia concentrations building up in the blood to levels that become toxic, as well as other blood changes that become detrimental to a lobsters health.

A lobster placed back into water after extended emersion will dump the ammonia and exchange accumulated $CO_2$ with $O_2$ in the water at a relatively fast rate, mainly via the gills. The effects of long-term emersion can effectively be reversed in a relatively short time period if ideal water conditions are provided during re-immersion. For example, a customer receiving live lobster shipments may unpack and re-immerse lobsters in a holding tank at their reception facilities.

Generally, a standard acceptable amount of mortality occurring from a shipment is usually below 3-5% of the total shipped weight of live lobsters. There are many factors that cause this mortality, most of which have to do with shipping box handling by cargo handling staff and temperature conditions during transit to the customer. There is also a risk of mortality and loss of quality due to post shipment re-immersion water conditions in the customers tanks that may contain inadequate filtration systems or refrigeration and therefore have high water ammonia concentrations or warmer than ideal water temperatures, as well as pre-shipment quality selection criteria and condition of the lobsters used for shipment by the supplier. Since handling plays a key role in shipment success, recent advances in shipping box configuration over the past decade have led to new standards such as keeping lobsters segregated in shipping boxes to minimize handling damage caused by lobsters in close contact with neighboring lobsters spiny shells. In the segregated boxes, lobsters are packed vertically, similar to a box of wine, with dividers in the box creating a cell for each lobster. This type of packaging can reduce mortality on shipments and also allow suppliers to successfully ship lower quality lobsters that might not survive the journey using standard communally packed lobster box configurations.

Re-immersing lobsters after long term emersion causes an initial efflux (removal) of built up metabolic wastes from their blood at a very rapid rate, as noted above. With this high rate of efflux, it is possible to maintain live lobsters in a strong condition for longer periods during extended time out of water by providing periodic doses of water, such as seawater, to aid in efflux of accumulated metabolic waste. Lobsters are able to capture and utilize, for efflux of accumulated waste, water that is dripped down over them while they are stored vertically.

To ensure proper delivery of water to lobsters in a shipping system, any of various water flow configurations could potentially be used. For example, a waterproof container could be configured with dividers. Lobsters could then be packed substantially vertically with tail down and claws up and placed under a spray of filtered, chilled seawater. In a trial using this type of configuration, measurements of blood parameters pre-spray and at various intervals during spray were taken, and it was discovered that lobsters were indeed capable of retaining their natural state of waste concentrations in their blood regardless of the length of time under a continuous spray condition. This meant that efflux of metabolic waste was possible with lobsters without the requirement that they be completely submerged in water. This particular trial was concluded after approximately 4 weeks in a spray condition and it was noted that the lobsters were strong and no mortality was observed. This result represents an improvement on the standard storage methods of immersing lobsters held in crates in water and it was even noted that the weak lobsters used for the spray trial became strong lobsters at the end of the trial.

Although the present disclosure refers to spray of shellfish, it should be appreciated that this is not intended to infer that water is necessarily distributed through a spray nozzle. As described below, for example, water flow could be distributed to cells in a container using a perforated plate. A flow of water could be in the form of a spray, but need not necessarily be a spray.

The next discovery step involved determining if the spray could be interrupted, to expose the lobster to air and no water (emersed), and after a period of air exposure, to resume the spray for various time periods to determine how much spray time could return the lobsters blood parameters back to normal levels. Various emersion/spray time combinations were investigated over the course of multiple trials. This series of trials revealed that the spray time for a return to normal blood parameters was related to the amount of time the lobsters were in air accumulating metabolic waste in their blood. Further trials allowed determination of an emersed/spray duration cycle that allowed for the continuous maintenance of the lobster for extended periods (1-2 weeks) with no loss of quality and no mortality. For example, one set of parameters for emersion/spray includes a 24 hour emersion period followed by a 15 minute spray. This emersion/spray cycle seems to allow lobsters to maintain good condition indefinitely. It is important to note that other emersion/spray parameters could be used and different results could be observed under other testing and/or actual operating conditions. For example, an increased flow rate of the spray may reduce the spray cycle duration from 15 minutes to something shorter, and extended emersion times above 24 hours may be feasible if spray cycle times are adjusted to allow for the reduction in ammonia to ambient levels.

The trials referenced above were performed in laboratory conditions using natural seawater at flow rates between 38 and 57 liters per minute, temperatures between 3° C. and 4° C., pH approximately 7.6 to 8.0, and dissolved oxygen between 95% and 100% saturation. These laboratory conditions might not match other testing or operating conditions.

A further trial used a water flow rate of 0.5 liters per minute per lobster when the spray is on. It is believed that this flow rate could be reduced and still work well. As an illustrative example, flow rates might range as low as 0.01 liters per minute per lobster. Although there might not be a maximum flow rate above which efflux of metabolic waste is not effective, actual flow rates could be limited based on a maximum rate at which water is able to flow through containers, based on water reservoir size, and/or in order to limit pumping system power consumption, for example.

The concept of emersion and periodic spray/immersion could be applied to maintain lobsters for extended periods, for storage and/or shipping for instance. Application of this concept to shipping could provide for maintenance of live lobsters long enough to use alternate shipping methods, such as ocean freight, for overseas consignments.

FIG. 1 is a diagram illustrating an example emersed shellfish storage system. The example system 100 includes waterproof shipping boxes 102 with dividers 112. For example, the standard cardboard box or polystyrene box could be replaced with a polyethylene type box. Corrugated plastic is one such material that could be suitable for this purpose due to its waterproof and insulating qualities. The divider 112 could be made from the same or a different material.

An insert 110 for the top of each box 102, which also could be made from the same material as the box or from a different material, is perforated and acts as a flow distribution plate above packed lobsters and/or other shellfish, to allow water to be distributed over each cell of the divider 112. As noted above, lobsters are described as an example, although the teachings herein could also or instead be applied to other shellfish. In each divider cell below the insert 110, a live lobster could be packed substantially vertically, either tail or claws first. Lobsters have not been shown in FIG. 1 to avoid congestion in the drawing.

Water that flows onto the insert 110 will flow over the lobsters and/or other shellfish below, and then collect at the base of the box 102 and drain out to the box below. A bottom insert 114 is shown in FIG. 1 as an example of a component that could be used to direct water within a box 102 for drainage, and this insert could be made from the same material as other box components or from a different material.

As shown in FIG. 1, boxes 102 could be stacked on a pallet 104. In this example system 100, each box 102 includes a drainage hole 120 at the bottom of an end wall. In one embodiment, a drainage hole 120 is provided at the bottom of each end wall of each box 102, and water drains out these drainage holes after flowing over the packed lobsters and/or other shellfish. Although not specifically shown in FIG. 1, the divider 112 could be formed with passages or channels at its bottom edges to permit water to flow from each divider cell to the drainage hole(s) 120. The bottom insert 114 could also or instead have passages or channels to enable water flow under the divider 112 and/or to direct water to the drainage hole(s) 120.

The top insert 110 is sized to fit inside the top edges of a box 102. The upper edges of the top insert 110 are at or below the top edges of the box 102 when placed inside the box 102, and the top insert is carried by the divider 112. The upper edges of the top insert 110 of one box 102 can also carry another box stacked on top. Water that drains through the drainage holes 120 in a higher box 102 in a stack is directed onto the upper insert 110 in the next lower box in the stack by the end flaps 116 of the lower box in the example shown. This type of arrangement could also or instead be provided using drainage holes at the bottom of each side wall and the side flaps 118 of the lower box 102. Each drainage hole 120, although only visible in an end wall of each box 102 in FIG. 1, could be formed partly in the end wall and partly in a bottom wall or flap of each box. The portion of the drainage hole 120 in the bottom wall or flap permits water to flow out of the drainage hole, onto an end flap 116 of an open lower box 102, and past the bottom edges of the upper box so that water flow onto the upper insert 110 of the lower box is not blocked.

Once the water reaches the bottom box 102, it drains into a collection compartment that is either incorporated into the pallet 104 holding all of the shipping boxes, or a collection container situated on top of the pallet. In the example system 100, water drains into a collection compartment incorporated into the pallet 104 through passages 122 in the top of the pallet. The collection compartment or container would hold the drained water, and would be connected to (and could even hold) a pumping system that can recirculate the water back up to the top box 102. Depending on the amount of water, the collection compartment or container could be connected to or include passive biofiltration, or some other treatment system that could also be carried by the pallet 104, to reduce waste such as ammonia in the water that is collected between flow cycles.

There are no gel ice packs in this example system, unlike individual air freight shipping boxes, and temperature control for the pallet 104 could be provided by a transport truck trailer or refrigerated container that is loaded onto a truck and transported to an ocean going vessel. The system 100 could be self-powered with a pump and onboard power supply such as a battery with enough power to last for one overseas trip. Another option could be to utilize the power from a refrigerated oceangoing container to either keep a battery back up charged, or fully power a circulation system on each pallet 104. A pallet system such as the example system 100 shown in FIG. 1 could also or instead be placed into a land based cooler. If the pallet system is not self-powered, it could be placed under a seawater tap system that provides chilled seawater either continuously or intermittently as described above, or in a cooler that has been equipped with auxiliary power to run a pump system.

On arrival overseas, the boxes 102 could be shipped, in the same refrigerated shipping container as used to ship the boxes overseas, to a depot or customer. The boxes 102 could then be maintained in the pallet system or placed in a continuous flow system to maintain the lobsters and/or other shellfish until final sale. Ice packs could instead be added to the individual boxes 102, the drainage holes 120 could be sealed, and the tops of the boxes could be closed and sealed and then forwarded using traditional air freight or refrigerated land transport methods. Once a final customer receives an individual box 102, they can place the box in their cooler, remove the spent gel ice packs, and periodically pour cold seawater over the distribution plate or drip plate top insert 110 inside the box to refresh the lobsters and/or other shellfish inside, allowing the customer to store the shellfish for extended periods without the need of an expensive and complicated live tanking system.

Other box designs are also contemplated. For example, a somewhat more classical box design where top and bottom box flaps, when closed, do not entirely close the top and bottom of the box, would provide an upper opening between the closed top flaps through which water can flow into a box, onto its upper insert 110 and over shellfish, and a bottom opening between the closed bottom flaps through which water can flow into another box or collection container below. The top and bottom openings could then be sealed, with covers, adhesive tape, or otherwise, to maintain an insulated box and keep water from draining from the bottom of the box when a box is removed from a pallet system for further transport or storage, for example.

The manner in which openings in the boxes could be sealed could also vary between different embodiments. Covers as noted above represent one possible example of how boxes could be sealed. Tape could also or instead be used. In another embodiment, boxes could be placed into a separate outer box or container if being shipped and/or stored with gel ice packs.

A flow system could be used in conjunction with other forms of containers as well. For instance, harvested lobsters could be packed into industry standard plastic crates which hold approximately 90 to 100 pounds each, for offloading from a vessel. These crates typically have an open interior space and slotted sides for drainage. Dividers could be used in these crates so that the lobsters are packed substantially vertically, with water being supplied to the divider cells for flow over the lobsters gills. Top inserts such as shown in FIG. 1 at 110 could also be placed on the dividers after the lobsters are packed into the divider cells. The crates, which include two top flaps that partially overlap and interlock when closed, could then be left open and stacked substantially as shown in FIG. 1.

FIG. 2 is a block diagram illustrating another example of an emersed shellfish storage system. The example system 200 includes a water reservoir 202, a water treatment system 204, a pump 206, a controller 207, a distributor 208, one or more containers 210, and a collector 212. Most of the components in FIG. 2 are coupled together through tubing, piping, or other types of connections for carrying water. The controller 207 could be coupled to the pump 206, and possibly other components such as the distributor 208 and/or the water treatment system 204, through electrical and/or other types of control connections.

FIG. 1 illustrates examples of how at least some of the components in FIG. 2 could be implemented. For instance, the boxes 102 in FIG. 1 represent one example of the containers 210 in FIG. 2. The pallet 104 in FIG. 1 includes an integrated reservoir and passages 122 through which water flows from stacks of boxes 102 back into the reservoir. Such an integrated reservoir and integrated passages are examples of the water reservoir 202 and the collector 212 shown in FIG. 2.

The water treatment system 204 is coupled directly to the water reservoir 202 in the example shown, but could instead be indirectly coupled to the water reservoir through the pump 206 if water is to be treated at the output side of the pump, for example. Water could also or instead be treated at the collector 212 side of the water reservoir 202. The water treatment system 204 could include a filter to filter out waste from water collected by the collector 212, for example. In some embodiments, an exchange mechanism could be provided to exchange water in the water reservoir 202 for fresh new seawater. When implemented onboard a ship, for example, a supply of fresh seawater might be available, and water in the water reservoir 202 could be refreshed from time to time from the supply. Use of artificially prepared seawater is also contemplated. Depending on availability, it could be possible to implement a flow system without a water reservoir 202. A harvest vessel, for example, might have seawater readily available, and seawater could be supplied to the flow system as needed, with collected seawater being expelled back into the sea from the collector 212. Such flow through systems could provide improved water quality on a boat or a plant with a seawater supply, for instance.

The water treatment system 204 could actually be implemented inside the water reservoir 202, such as inside a pallet. Biofilters that filter out metabolic waste, for example, could actually be implemented as any material that will grow a colony of bacteria that metabolises the lobster/shellfish waste. Some sort of high surface area biofilter material could be provided inside the water reservoir 202 to house biofilter bacteria which would passively filter spray water between spray cycles.

The exact implementation of the pump 206 would be dependent on such factors as flow rate (which would in turn depend on temperature and the number of lobsters being stored or shipped) and power requirements and availability. Any of various types of fluid pump may be suitable. The controller 207 is similarly implementation-dependent. A fluid pump could incorporate an integrated controller, in which case a separate controller might not be provided. A controller 207 could also or instead control multiple functions such as pump operation (flow cycle and flow duration, pump/flow speed), water distribution (e.g., to turn off flow lines if a pallet is not full), and/or water treatment at 204.

The distributor 208 shown in FIG. 2 is intended to generally represent tubing or piping through which water is distributed to the container(s) 210. In the example system 100 shown in FIG. 1, the top insert 110 in the top box 102 of each stack distributes water to the cells inside each box, and therefore a simple tube or hose, with some sort of splitter or manifold where multiple boxes are being supplied with spray water, could be implemented as the distributor 208. In an embodiment, perforated tubing or piping segments are connected to supply tubing or piping and are located above a top box in a stack, so that water from the supply tubing or piping exits the perforations and is thereby distributed to the container(s) 210. The perforations could be drilled or otherwise formed in the perforated tubing or piping. Ends of the perforated tubing or piping that do not connect to the supply tubing or piping could be capped or otherwise sealed, to force water through the perforations.

With reference now to both FIGS. 1 and 2, a container support such as the pallet 104 in FIG. 1 has a surface to support containers 210, illustratively the boxes 102. Each container 102, 210 has respective cells or compartments, which are oriented perpendicular to the surface of the container support, to accommodate individual live lobsters and/or other shellfish in a generally vertical orientation substantially perpendicular to the surface of the container support. The water reservoir 202 is carried by the container support, and could be integrated into the container support in some embodiments as shown in FIG. 1. A pump system, which includes at least a pump 206 and could also include other components such as a distributor 208 in some embodiments, is coupled to the water reservoir 202 and carried by the container support, to pump water from the reservoir to one or more of the containers 102, 210 and above the lobsters/shellfish. In a system as shown in FIG. 1, water is pumped to the top of each box 102 at the top of each stack. A collector 212 is also coupled to the water reservoir 202 and carried by the container support, to collect (and provide to the reservoir) water that is pumped by the pump system and flows over the lobsters/shellfish. This allows water to be recovered and recycled, and provides for self-contained operation of an emersed storage system in some embodiments.

As noted above, the water reservoir 202 could be integrated into the container support. The collector 212 could also or instead be integrated into the container support, as passages 122 for example.

A complete pump system, in addition to the pump 206, could include a power source coupled to the pump system and carried by the container support. Externally powered embodiments are also contemplated.

When there are multiple containers 102, 210 in a stack on the surface of the container support, the pump system pumps water from the water reservoir 202 to a top of a top container in the stack. Each container 102, 210 in the stack has a drain, illustratively the drainage hole(s) 120, through which water that flows over the lobsters/shellfish in the container drains to a lower container in the stack, or from a lowest container in the stack to the collector 122, 212. Water that flows over the lobsters/shellfish could be directed to the drain by a bottom insert 114 in each container 102, 210.

The top insert 110 is an example of a perforated top insert, carried at or below a top edge of each container 102, 210 by its divider 112, to distribute water to the cells in the container. In FIG. 1, each container 102, 210 in a stack has top flaps, and the containers are stacked with the top flaps open. An open top flap of each of the containers below the top container in each stack is adjacent the drain of an upper container in the stack to direct water from the drain of the upper container in the stack onto the top insert 110. The drainage hole(s) 120 and end flaps 116 are positioned in this manner in the example system 100.

Embodiments of the present disclosure have been described above primarily in the context of example systems. Methods are also contemplated. For example, a method 300 as shown in the flow chart of FIG. 3 relates to manufacture of such a system. The example method 300 involves providing the various system components, including a container support at 302, a water reservoir at 304, a pump system at 306, and a collector at 308. Other system components could also be provided in some embodiments.

Another example method 400 is shown in FIG. 4. This example method relates to using a system as disclosed herein, and includes a step 402 of providing containers on a container support. The container support has a surface to support the containers, a water reservoir, and a pump system, and each container has respective cells to accommodate individual live lobsters and/or other shellfish in a vertical orientation substantially perpendicular to the surface, as described above. The example method 400 also includes intermittently pumping water from the reservoir to one or more of the containers above the lobsters/shellfish using the pump system at 404, and collecting, at 406, water that is pumped by the pump system and flows over the lobsters/shellfish. The collected water can then be provided back to the reservoir.

The example methods 300 and 400 are intended solely for illustrative purposes. Other embodiments may include further, fewer, and/or different operations performed in a similar or different order. For instance, FIG. 3 is not intended to imply that each operation is necessarily performed separately or in sequence. A pallet with an integrated water reservoir and collector could be moulded or otherwise formed in plastic, for instance, to simultaneously provide the container support, the water reservoir, and the collector as shown at 302, 304, 308. The pump system and/or other components could be provided separately, and possibly by a separate entity.

The provision of components as shown in FIG. 3 need not necessarily involve manufacturing those components. For example, components could be sourced from a manufacturer and need not necessarily be manufactured by the same entity that actually builds a flow system or uses containers as disclosed herein. Component manufacturing and assembly could thus be performed by separate entities, in which case a manufacturer provides system components by manufacturing them, and an assembler provides the components by purchasing them from a manufacturer or distributor.

Similar comments apply in respect of the example method 400.

Embodiments of the present disclosure may provide for live lobsters and/or other shellfish to be maintained out of water for an extended period of time, during storage and/or shipping. Savings in physical space requirements, weight, and water usage could also be realized, in that substantially vertically stored live lobsters/shellfish could effectively replace immersed lobsters/shellfish in 90 lbs capacity crates, which is the current industry standard. Embodiments might also improve storage mortality performance.

There could additionally be gains in handling efficiencies. In one scenario, freshly harvested lobsters/shellfish are transferred out of water in plastic crates on a refrigerated truck to central holding and shipping facilities. The crates of lobsters/shellfish are then floated in an industry standard refrigerated reservoir system. Lobsters/shellfish are subsequently packed from these crates into shipping boxes for shipment to customers. With the technology disclosed herein, the lobsters/shellfish can be packed into their shipping boxes after harvest, transported with intermittent flow as outlined above to the central facilities, and then held in a flow system at the central facilities until boxes are required to be shipped out to a customer. This effectively eliminates the extra handling and labour required to repack lobsters/shellfish at the central facilities and provides an improved environment for the lobsters/shellfish during distribution and storage.

There are currently several spray systems for lobsters, but these utilize standard packing boxes or crates that must be placed into a specialized shipping container that is equipped with a spray, chilling, and filtration system. Such a system has the disadvantage of being a custom implementation and therefore does not suit use for ocean-going freight unless it can be fully utilized for the return trip to the originating site. The storage system described herein does not require custom shipping containers and the lobster/shellfish shipment can be small, such as one pallet load. Other items can be packed into the same shipping container going overseas, since the pallet of lobsters/shellfish is self-contained in some embodiments and might only use refrigeration provided by the ocean shipping container.

Examples of complete emersed shellfish storage systems and methods are described in detail above. These example systems include containers (e.g., boxes) and a container carrier (e.g., a pallet).

Considering a container itself, the top insert 110, in addition to acting as a drip tray in an emersed storage system, could provide more even distribution of cool air from gel ice packs placed thereon when the container is used as a standard shipping box out of water. When ice packs are placed on top of the dividers in a container, for example, cold air tends to drop down into the cells directly below them, making lobsters in those particular cells colder than lobsters in cells not directly below an ice pack. Better distribution of cool air by the top insert 110 would reduce cold/hot spots in a container. Fluid communication channels such as vent holes or slits could be formed in the divider in each, or at least some, of the divider cell walls, such as at least at the bottom third of the divider. Such channels would allow cool air that drops down from a gel ice pack above to not just sit in individual cells, but also diffuse more freely to other adjacent cells. This can even out the air temperature in the container and mitigate or even eliminate an issue of certain sections of the container being much warmer or colder than other sections due to cool air being trapped in individual cells of the divider.

Thus, in one embodiment, a container might include a divider that divides an interior space of the container into respective cells, which are oriented perpendicular to a bottom surface of the container support, to accommodate live shellfish in a vertical orientation substantially perpendicular to the bottom of the container, and a perforated top insert, carried at or below a top edge of the container by the divider, that distributes fluids to the cells. The fluids could be water (in an emersed storage system) and/or air.

A container support, according to another embodiment, includes a surface to support one or more containers that accommodate live shellfish; a water reservoir; a collector coupled to the water reservoir and carried by the container support, to collect and provide to the reservoir water that is pumped from the water reservoir and flows over the shellfish.

What has been described is merely illustrative of the application of principles of embodiments of the invention. Other arrangements and methods can be implemented by those skilled in the art without departing from the scope of the present invention.

For example, the drawings are intended solely for illustrative purposes. Other embodiments might include further, fewer, or additional features, arranged in a similar or different manner than shown.

In addition, although described primarily in the context of methods and systems, other implementations are also contemplated, as instructions stored on a computer-readable medium in the case of spray control or water treatment control features, for example.

We claim:

1. A system for emersed storage of live shellfish, the system comprising:
   a container support comprising a surface to support a plurality of containers;
   the containers on the surface of the container support, each container comprising a divider that provides respective cells to accommodate live shellfish in a vertical orientation substantially perpendicular to the surface, and a perforated top insert carried at or below a top edge of the container by the divider;
   a water reservoir carried by the container support;
   a pump system coupled to the water reservoir and carried by the container support, to pump water from the reservoir to one or more of the containers above the shellfish;
   a collector coupled to the water reservoir and carried by the container support, to collect and provide to the reservoir water that is pumped by the pump system and flows over the shellfish.

2. The system of claim 1, the water reservoir being integrated into the container support.

3. The system of claim 1, the collector being integrated into the container support.

4. The system of claim 1, further comprising:
   a power source coupled to the pump system and carried by the container support.

5. The system of claim 1, further comprising:
   a water treatment system coupled to the water reservoir.

6. The system of claim 5, the water treatment system comprising one or more of:
   a filter; and
   an exchange mechanism to exchange water in the reservoir for fresh water.

7. The system of claim 1,
   the containers comprising multiple containers in a stack on the surface of the container support, the pump system to pump water from the reservoir to a top of a top container in the stack,
   each container in the stack comprising a drain to allow water that flows over the shellfish in the container to drain from the container.

8. The system of claim 7, each container in the stack comprising a bottom insert to direct the water that flows over the shellfish to the drain.

9. The system of claim 7,
each container in the stack comprising a plurality of top flaps,
the containers in the stack below the top container in the stack being stacked with the top flaps open, an open top flap of each of the containers below the top container in the stack being adjacent the drain of an upper container in the stack to direct water from the drain of the upper container in the stack onto the top insert.

10. A method for emersed storage of live shellfish, the method comprising:
providing a container support comprising a surface to support a plurality of containers;
providing the containers on the surface of the container support, with each container comprising a divider that provides respective cells to accommodate live shellfish in a vertical orientation substantially perpendicular to the surface, and a perforated top insert carried at or below a top edge of the container by the divider;
providing a water reservoir carried by the container support;
providing a pump system coupled to the water reservoir and carried by the container support, to pump water from the reservoir to one or more of the containers above the shellfish;
providing a collector coupled to the water reservoir and carried by the container support, to collect and provide to the reservoir water that is pumped by the pump system and flows over the shellfish.

11. The method of claim 10, the water reservoir being provided as an integrated water reservoir integrated into the container support.

12. The method of claim 10, the collector being provided as an integrated collector integrated into the container support.

13. The method of claim 10, further comprising:
providing a power source coupled to the pump system and carried by the container support.

14. The method of claim 10, further comprising:
providing a water treatment system coupled to the water reservoir.

15. The method of claim 14, the water treatment system being provided as one or more of:
a filter; and
an exchange mechanism to exchange water in the reservoir for fresh water.

16. A method for emersed storage of live shellfish, the method comprising:
providing a plurality of containers on a container support, the container support comprising a surface to support the plurality of containers, a water reservoir, a pump system coupled to the water reservoir, and a collector coupled to the water reservoir, and each container comprising a divider that provides respective cells to accommodate live shellfish in a vertical orientation substantially perpendicular to the surface, and a perforated top insert carried at or below a top edge of the container by the divider;
pumping water from the reservoir to one or more of the containers above the shellfish using the pump system;
collecting and providing to the reservoir, using the collector, water that is pumped by the pump system and flows over the shellfish.

17. The method of claim 16,
the plurality of containers comprising multiple containers in a stack on the surface of the container support, the pumping comprising pumping water from the reservoir to a top of a top container in the stack,
each container in the stack comprising a drain to allow water that flows over the shellfish in the container to drain from the container.

18. The method of claim 17,
each container in the stack comprising a bottom insert to direct the water that flows over the shellfish to the drain.

19. The method of claim 17,
each container in the stack comprising a plurality of top flaps,
the providing comprising providing the plurality of containers below the top container in the stack stacked with the top flaps open, an open top flap of each of the containers below the top container in the stack being adjacent the drain of an upper container in the stack to direct water from the drain of the upper container in the stack onto the top insert.

20. The method of claim 16, the water reservoir being provided as an integrated water reservoir integrated into the container support.

21. The method of claim 16, the collector being provided as an integrated collector integrated into the container support.

22. The method of claim 16, further comprising:
providing a power source coupled to the pump system and carried by the container support.

23. The method of claim 16, further comprising:
providing a water treatment system coupled to the water reservoir.

24. The method of claim 23, the water treatment system being provided as one or more of:
a filter; and
an exchange mechanism to exchange water in the reservoir for fresh water.

25. The method of claim 10,
the containers comprising multiple containers in a stack on the surface of the container support, the pump system to pump water from the reservoir to a top of a top container in the stack,
each container in the stack comprising a drain to allow water that flows over the shellfish in the container to drain from the container.

26. The method of claim 25, each container in the stack comprising a bottom insert to direct the water that flows over the shellfish to the drain.

27. The method of claim 25,
each container in the stack comprising a plurality of top flaps,
the containers in the stack below the top container in the stack being stacked with the top flaps open, an open top flap of each of the containers below the top container in the stack being adjacent the drain of an upper container in the stack to direct water from the drain of the upper container in the stack onto the top insert.

* * * * *